(12) United States Patent
Thomas et al.

(10) Patent No.: US 10,006,461 B2
(45) Date of Patent: Jun. 26, 2018

(54) ELECTROLYTE CIRCULATION IN FUEL CELLS STACKS WITH REDUCED LEAKAGE CURRENT

(71) Applicant: AFC Energy plc, Finsgate, London (GB)

(72) Inventors: Martin Thomas, München (DE); Andreas Karl Backstrom, Godalming (GB)

(73) Assignee: AFC ENERGY PLC, London (GB)

( * ) Notice: Subject to any disclaimer, the term of this patent is extended or adjusted under 35 U.S.C. 154(b) by 0 days. days.

(21) Appl. No.: 14/402,650

(22) PCT Filed: Apr. 30, 2013

(86) PCT No.: PCT/GB2013/051111
§ 371 (c)(1),
(2) Date: Nov. 20, 2014

(87) PCT Pub. No.: WO2013/175169
PCT Pub. Date: Nov. 28, 2013

(65) Prior Publication Data
US 2015/0171460 A1    Jun. 18, 2015

(30) Foreign Application Priority Data

May 21, 2012    (GB) .................................. 1208940.5

(51) Int. Cl.
*H01M 8/08*    (2016.01)
*F04D 13/10*    (2006.01)
(Continued)

(52) U.S. Cl.
CPC ........ *F04D 13/10* (2013.01); *H01M 8/04276* (2013.01); *H01M 8/04291* (2013.01);
(Continued)

(58) Field of Classification Search
CPC ......................... H01M 8/04291; H01M 8/2485
See application file for complete search history.

(56) References Cited

U.S. PATENT DOCUMENTS 3,436,272 A * 4/1969 Gelting ................. H01M 8/241
429/457
4,371,433 A    2/1983 Balko et al.
(Continued)

FOREIGN PATENT DOCUMENTS

EP    0107396 A    8/1988
GB    2163595 A1    2/1986
(Continued)

OTHER PUBLICATIONS

International Search Report and Written Opinion for International Application No. PCT/GB2103/051111 dated Aug. 2, 2013.
(Continued)

*Primary Examiner* — Jonathan G Leong
*Assistant Examiner* — Victoria H Lynch
(74) *Attorney, Agent, or Firm* — Workman Nydegger (57) ABSTRACT

A fuel cell stack (10) comprises a plurality of fuel cells each with a chamber (K) for electrolyte with at least one inlet (114) and at least one outlet (116), and an inlet header (45) to supply electrolyte to all the cells in parallel. Each cell comprises a first plate (12) to define the electrolyte chamber (K), a second plate (13) to define an oxidizing gas chamber (0) and a third plate (14) to define a fuel gas chamber (H), each of these plates (12-14) also defining a side chamber (36) adjacent to but sealed from the corresponding chambers (K, 0, H), so the side chambers (36) defines an electrolyte outlet channel. An electrolyte flow channel (15) is also defined above the top portion of and in communication with the electrolyte chamber (K), so electrolyte is supplied from electrolyte supply (45) through openings (56) into the electrolyte chamber (K), flows upwards towards the top of the
(Continued)

electrolyte chamber (K), exits said electrolyte chamber (K) via grooves (60), flows along the flow channel (15), breaks up into droplets at lip (68) and falls into the side chamber (36) prior to being expelled via electrolyte outlet (116). This arrangement reduces leakage currents.

11 Claims, 4 Drawing Sheets

(51) Int. Cl.
    *H01M 8/083* (2016.01)
    *H01M 8/24* (2016.01)
    *H01M 8/2485* (2016.01)
    *H01M 8/04276* (2016.01)
    *H01M 8/04291* (2016.01)
    *H01M 8/0289* (2016.01)

(52) U.S. Cl.
    CPC ......... *H01M 8/083* (2013.01); *H01M 8/2445* (2013.01); *H01M 8/2485* (2013.01); *H01M 8/0289* (2013.01)

(56) References Cited

U.S. PATENT DOCUMENTS

| | | | |
|---|---|---|---|
| 4,894,294 A | 1/1990 | Ashizawa et al. | |
| 6,511,766 B1* | 1/2003 | Loutfy | H01M 8/0213 429/143 |
| 2003/0059664 A1 | 3/2003 | Menjak et al. | |
| 2005/0221151 A1* | 10/2005 | Suzuki | H01M 8/0247 429/434 |
| 2007/0009779 A1* | 1/2007 | Mohri | H01M 8/2465 429/434 |
| 2012/0202127 A1* | 8/2012 | Friesen | B01F 3/04751 429/406 |
| 2012/0270131 A1* | 10/2012 | Fukuta | H01M 8/248 429/454 |

FOREIGN PATENT DOCUMENTS

| | | |
|---|---|---|
| WO | 99/12220 A | 3/1999 |
| WO | 2011141727 A1 | 11/2011 |

OTHER PUBLICATIONS

Great Britain Search Report for International Application No. GB1208940.5, dated Aug. 23, 2012.
English Translation of Japanese Abstract for Japanese Application No. JP19840072343 B1 dated Oct. 29, 1985.
English Translation of Japanese Abstract for Japanese Application No. JP19830092052 B1 dated Dec. 8, 1984.

* cited by examiner

ELECTROLYTE CIRCULATION IN FUEL CELLS STACKS WITH REDUCED LEAKAGE CURRENT

The present invention relates to liquid electrolyte fuel cells, preferably but not exclusively alkaline fuel cells, and to the design of such fuel cells in stacks.

BACKGROUND TO THE INVENTION

Fuel cells have been identified as a relatively clean and efficient source of electrical power. Alkaline fuel cells are of particular interest because they operate at relatively low temperatures and have a high theoretical efficiency compared to other fuel cell technologies. Acidic fuel cells and fuel cells employing other aqueous electrolytes are also of interest. Such fuel cells operate at a voltage of usually less than one volt (typically 0.5-0.9 V). To achieve higher voltages, fuel cells are typically arranged electrically in series to form a fuel cell stack. Fuel cells employing a liquid electrolyte typically comprise an electrolyte chamber that is separated from a fuel gas chamber (containing a fuel gas, typically hydrogen) and a further gas chamber (containing an oxidant gas, usually air). The electrolyte chamber is separated from the gas chambers using electrodes that are gas permeable, and carry a catalyst such as platinum. Within a fuel cell stack the electrolyte may be circulated through the electrolyte chambers from headers or distribution ducts, so that the electrolyte flows through all the cells in parallel.

A problem with such an arrangement is that there will be some electrical (i.e. ionic) leakage current between the cells through the electrolyte in the headers or distribution ducts. This can be minimised by designing the electrolyte flow paths to raise their ionic resistance, but this measure cannot eliminate the ionic leakage currents altogether. Another problem with such fuel cell stacks is to design the cells to ensure uniformity of pressure and mass flow rates between the cells and within every cell.

WO 2011/141727 (AFC Energy) has described a fuel cell stack in which electrolyte is fed to each cell through several headers in parallel; and in which electrolyte emerges from each cell into an open channel at the top of the cell, and then trickles or falls over the edge of the stack. However this arrangement does not eliminate the ionic leakage currents; and the exposed electrolyte may cause corrosion, for example of electrical contacts.

DISCUSSION OF THE INVENTION

According to the present invention there is provided a fuel cell stack comprising a plurality of fuel cells each with a chamber for electrolyte with at least one inlet and at least one outlet, and an inlet header to supply electrolyte to all the cells in parallel, wherein each cell comprises a first plate to define an electrolyte chamber, a second plate to define an oxidising gas chamber and a third plate to define a fuel gas chamber; wherein each first plate, each second plate, and each third plate also defines at least one side chamber adjacent to but sealed from the electrolyte chamber, the oxidising gas chamber and the fuel gas chamber respectively, the corresponding side chambers of adjacent plates of the stack communicating with each other to define an electrolyte outlet channel, the electrolyte being arranged to flow vertically upwards or downwards through the electrolyte chamber; an electrolyte flow channel arranged to carry outflowing electrolyte from the electrolyte chamber, the electrolyte flow channel communicating with the electrolyte outlet channel near the top of the electrolyte outlet channel, so that the electrolyte falls from the electrolyte flow channel into the electrolyte outlet channel.

In one embodiment the electrolyte flow channel is defined above and in communication with the electrolyte chamber, arranged such that in use there is a free surface of electrolyte within the electrolyte flow channel, the electrolyte flow channel being separate from the corresponding electrolyte flow channels for other cells in the stack, but communicating with the side chamber such that the free surfaces of all the electrolyte flow channels are at a common pressure, the electrolyte flowing vertically upwards through the electrolyte chamber, and then falls from the electrolyte flow channel into the electrolyte outlet channel.

Where the electrolyte flow channel communicates with the side chamber there may be means to break up the flow into droplets. For example the flow may pass over a projecting lip from which the electrolyte falls freely into the side chamber as discrete droplets. Breaking up the electrolyte flow in this way effectively prevents leakage current through the emerging electrolyte. But even without breaking up the electrolyte, if the electrolyte trickles over the surface of the electrolyte outlet chamber it forms a thin layer so there is significant ionic resistance, which helps suppress the leakage current.

The electrolyte flow channel may form the uppermost part of the electrolyte chamber, but preferably the electrolyte chamber communicates via a plurality of outlet channels with the electrolyte flow channel.

The electrolyte may be fed from the header into the electrolyte chamber through a long narrow flow channel, for example with a cross-sectional area less than 12 mm$^2$, for example 8 mm$^2$, and of length greater than 50 mm, for example between 75 mm and 600 mm. There may be a single header which communicates with multiple inlets into the electrolyte chamber, for example through a long narrow flow channel communicating via a plurality of successive branches with the inlets. That can provide a path length between the header and each inlet of at least 200 mm. Within the electrolyte chamber there may be baffles to enhance flow uniformity within the chamber, for example transverse baffles to diffuse the electrolyte flow from each inlet.

In an alternative embodiment the electrolyte is arranged to flow vertically downwards through the electrolyte chamber, the electrolyte flow channel communicating between the bottom of the electrolyte chamber and near the top of the electrolyte outlet chamber. In this case the position at which the electrolyte flow channel communicates with the electrolyte outlet chamber may be at a height below the top of the electrolyte chamber, so there is a space between the liquid level in the electrolyte chamber and the top of the electrolyte chamber. The electrolyte may be drip fed into the top of the electrolyte chamber.

In this alternative embodiment the electrolyte breaks into droplets both when flowing into the cell and when flowing out of the cell, so eliminating the risk of ionic leakage currents.

The fuel cell stack also comprises electrodes, one at each face of each electrolyte chamber, to separate the electrolyte chamber from the adjacent fuel gas chamber and from the adjacent oxidising gas chamber respectively. Each electrode may locate in a recess in an adjacent plate. If the electrode extends to the outside of the stack, then the electrode must also define a side chamber corresponding to the side chamber of the adjacent plates.

The fuel cell stack must also be supplied with the fuel gas and the oxidant gas. These may be supplied through header ducts within the stack. As an alternative, where the oxidising gas is air, the air chambers may communicate directly with the surrounding air. For example air may be allowed to enter each oxidising gas chamber through one or more entry channels communicating with a face of the stack, for example the top or bottom face; and may leave through one or more exit channels communicating with a face of the stack. For example air may be supplied to one face of the stack at a higher pressure than air at another face of the stack, so air flows through the air chambers from the one face of the stack to the other. This avoids the requirement for there to be any air header ducts defined through the plates making up the stack, and so simplifies the structure of the plates.

In one embodiment the fuel cell stack locates within a container which has a lid or cover, and the lid includes a downwardly-projecting flange which is sealed to the top surface of the fuel cell stack so as to define a high-pressure air supply plenum. Consequently the remainder of the container, and so the sides and under surface of the fuel cell stack may be at substantially ambient pressure.

The invention will now be further and more particularly described, by way of example only, and with reference to the accompanying drawings in which.

Figure 1:
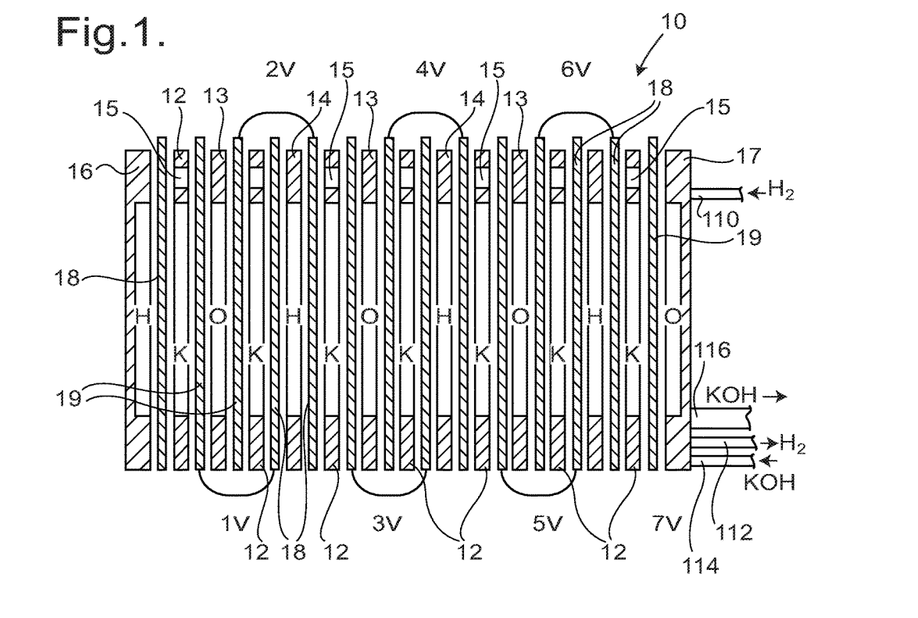
FIG. 1 shows a cross-sectional view perpendicular to the cell plane through a fuel cell stack of the invention.

Referring now to FIG. 1 there is shown a sectional view of a fuel cell stack 10, with the components separated for clarity. The stack 10 consists of a stack of frames 12, 13 and 14, each being a plate of an insulating plastics material, and each defining a rectangular through-aperture. Alternate frames 12 provide electrolyte chambers (marked K), and between successive electrolyte chambers are gas chambers, which are alternately air chambers (marked O) and fuel chambers (marked H). All the chambers are separated from neighbouring chambers by electrodes 18, 19 with permeable regions adjacent to the electrolyte chambers K, and with impermeable surrounding margins. The electrodes in contact with fuel chambers H are anodes 18, while the electrodes in contact with air chambers O are cathodes 19, each with suitable catalyst materials as described below. As indicated schematically, they are electrically connected in pairs, an anode 18 connected to a cathode 19; the pairs may be integral, the anode 18 and cathode 19 being defined at opposite ends of an electrode element, or alternatively they may simply be electrically connected, for example by connections between projecting tabs. The electrodes 18 and 19 all project partly above the frames 12, 13 and 14, to make such electrical contacts.

It will thus be appreciated that each electrolyte chamber K is between an oxygen chamber O and a fuel chamber H, and is separated from them by a cathode 19 and an anode 18 respectively, these constituting a single fuel cell. Successive fuel cells in the stack are in opposite orientations, but the arrangement is such that the cells are electrically in series. Taking the EMF of a single fuel cell as 1 V, the voltages of the connections between the electrodes 18 and 19 increase steadily along the stack 10 as marked, so that the cell stack 10 consisting of seven cells produces 7 V output.

Each frame 12 also defines a slot or channel 15 in the portion of the frame 12 above the electrolyte chamber K, this channel 15 defining part of the electrolyte flow path, as described below.

At the ends of the stack 10 are end plates 16, 17 that define blind recesses, and there are end electrodes, an anode 18 at one end and a cathode 19 at the other end. Gaskets (not shown) ensure that the frames 12, 13 and 14 and the end plates 16 and 17 are sealed to the electrodes 18 and 19. The flow of electrolyte to the electrolyte chambers K, and the flow of fuel gas to and from the fuel chambers H, takes place through respective fluid flow ducts through the frames 12, 13 and 14 defined by aligned apertures 42-45 (shown in FIG. 3). At one end of the stack 10 four ducts communicate with respective fluid flow ducts: a hydrogen supply duct 110, a hydrogen outflow duct 112, an electrolyte supply duct 114 and an electrolyte outlet duct 116. The components of the cell stack 10 are secured together after assembly by bolts through aligned apertures 34 (shown in FIG. 3).

The anodes 18 and the cathodes 19 have a catalyst coating which may be on the surface facing the respective gas chamber H or O, or on the opposite surface. The catalyst coatings for both cathode and anode electrodes may use a combination of catalyst particles and a binder. For example the coating on the cathodes 19 might comprise 10% Pd/Pt or silver on activated carbon, while the coating on the anodes 18 might comprise 10% Pd/Pt on activated carbon, in each case with 10% binder. The catalyst coating may be coated directly onto a metal component of the anode 18 or cathode 19, or may be coated on to a fluid-permeable electrically-conducting layer which is coated onto the metal component. Such a fluid-permeable electrically-conducting layer may comprise carbon black or carbon nanotubes and a binder, and may act as a gas diffusion layer as well as a support for the catalyst coating.

Figure 2:
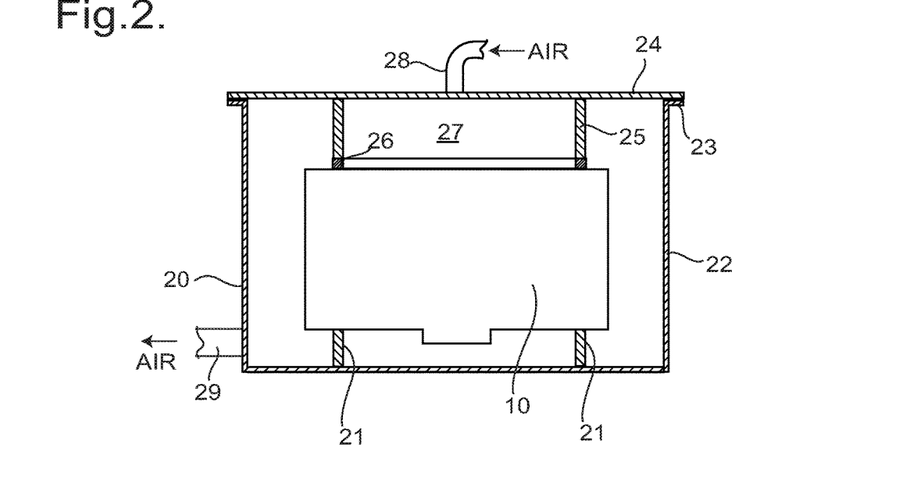
FIG. 2 shows a cross-sectional view parallel to the cell plane of a container enclosing the fuel cell stack of FIG. 1.

Referring now to FIG. 2, in which the structural details within the cell stack are not shown, the cell stack 10 is mounted within a container 20 so it rests on support bars 21. The container 20 comprises a box 22 of generally rectangular shape, somewhat larger than the cell stack 10, with a projecting lip or flange 23 around its opening. The container 20 includes a lid or cover 24 which rests on and seals to the flange 23. A projecting skirt or flange 25 projects down from the cover 24, with a resilient seal 26 along its lower edge which seals onto the top surface of the cell stack 10. The flange 25 thus defines an enclosed chamber 27 between the top surface of the cell stack 10 and the underside of the cover 24. Air is supplied from a pump (not shown) through a duct 28 into the enclosed chamber 27, to flow through the air chambers O and to emerge into remainder of the container 20, from which it is released through an exhaust duct 29.

The liquid electrolyte is supplied to one end of the stack 10 through the duct 114, and (as explained below) after flowing through the electrolyte chambers K and the channels 15, finally flows out through the outlet duct 116 at one end of the stack 10. The fuel gas (hydrogen) is also supplied to one end of the stack 10, through the duct 110, and the outflow duct 112 is also connected to that end of the stack 10.

Figure 3:
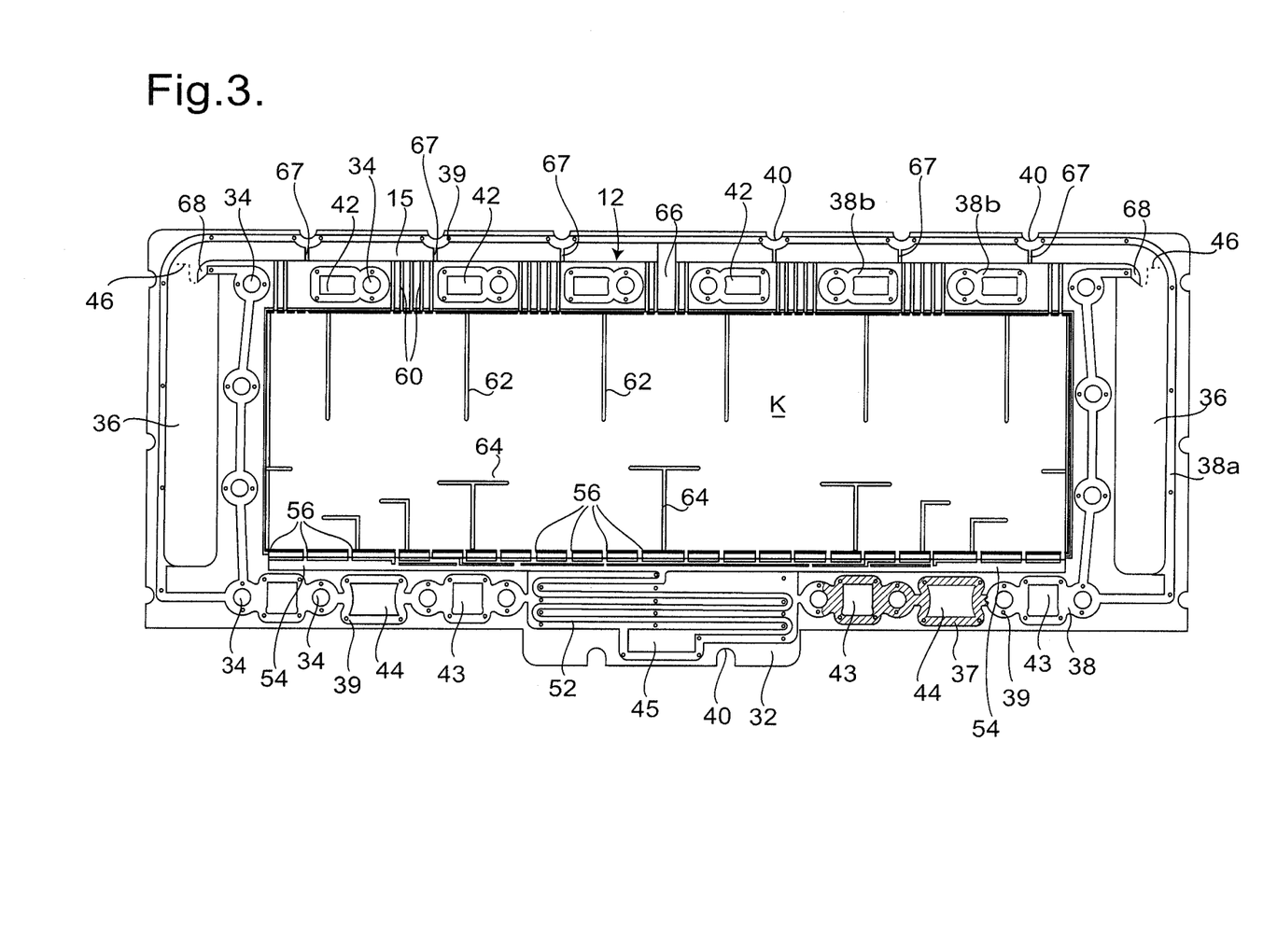
FIG. 3 shows a side view of an electrolyte plate of the fuel cell stack of FIG. 1.

Referring now to FIG. 3, there is shown a side view of a frame 12 that defines one such rectangular electrolyte chamber K. All the frames 12, 13 and 14 have several features in common, in addition to defining the respective rectangular chambers K, O and H, and the common features will be described first. In this embodiment each frame 12, 13 and 14 has an external shape which is also generally rectangular, but which also defines a projecting rectangular tab 32 near the middle of the bottom side of the frame 12, 13 or 14. Each frame 12, 13 and 14 also defines several circular apertures 34 spaced around the rectangular chamber K, O and H, through which bolts (not shown) pass, to hold the stack 10 together. Each frame 12, 13 and 14 also defines two rectangular side chambers 36, one on each side of the rectangular chamber K, O or H, the height of each side chamber 36 being greater than that of the rectangular chamber K, O or H. A sealing gasket 37 (only part of which is indicated, by hatching) locates in a groove 38 which surrounds each circular aperture 34 and which also extends in the portion of the frame 12, 13 and 14 lying between the rectangular chamber K, O and H and the adjacent side chamber 36, and a continuation 38a of this groove extends around the outside of the rectangular side chamber 36, to locate a corresponding continuation of the gasket 37. An identical groove 38 is provided on the opposite surface, containing an identical gasket 37, and the grooves 38 on opposite surfaces are lined by small holes 39. In addition there are semicircular notches 40 spaced apart along the side and top edge of each frame 12, 13 and 14 to locate additional clamping bolts.

Each frame 12, 13 and 14 also defines six apertures 42 above the rectangular chamber K, O or H, and six apertures below the rectangular chamber K, O or H, four generally square apertures 43 and two generally rectangular apertures 44. These apertures 42, 43 and 44 carry the fuel gas, such as hydrogen. Each frame 12, 13 and 14 also defines an aperture 45 in the tab 32, and these apertures 45 define a duct to carry the electrolyte supply.

The electrodes 18 and 19 are flat metal plates with permeable regions with catalyst in the portions adjacent to the chambers K, O or H, and with impermeable surrounding margins. In this embodiment each electrode 18 and 19 has an external shape which extends to the outside edge of the stack 10, projecting sufficiently for making the electrical contacts. Each electrode 18 and 19 also defines circular apertures 34 for bolts, and apertures 42, 43, 44 and 45 for the fuel gas and electrolyte, which align with the corresponding apertures 34, 42, 43, 44 and 45 in the frames 12, 13 and 14. Each electrode 18 and 19 also defines two rectangular apertures aligned with the side chambers 36 in the frames 12, 13 and 14, so that the side chambers 36 form a continuous chamber along the stack 10 between the end plates 16 and 17. As indicated by a broken line in FIG. 3, each electrode 18, 19 also defines a projection 46 at the top of the side chamber.

Now considering the features specific to the frames 12, within each frame 12 the groove 38 and the gasket 37 surrounds each of the apertures 43 and 44; and above the rectangular chamber K a groove 38b surrounds not only each circular aperture 34 but also an adjacent aperture 42, and locates a corresponding gasket (not shown). There are gaps between successive grooves 38c across the width of the frame 12, and in each such gap there are parallel grooves 60 which communicate between the chamber K and the slot or channel 15.

Electrolyte is supplied to all the electrolyte chambers K in the stack 10 through the distribution duct defined by the aligned apertures 45 in all the tabs 32. In each frame 12 the aperture 45 communicates through a long narrow zig-zag shaped slot 52 which branches into grooves 54 which lead to openings 56 communicating with the bottom edge of the electrolyte chamber K; there are successive branches in the grooves 54 to communicate at multiple openings 56 at locations equally spaced across the entire width of the electrolyte chamber K. The electrolyte emerges from the chamber K at the top through the parallel grooves 60 that lead into the slot or channel 15.

Within the electrolyte chamber K the frame 12 also defines baffles: there are baffles 62 that extend orthogonal to the top edge of the chamber K for slightly more than half the height of the chamber, constraining the electrolyte to flow upwardly towards the exit grooves 60; and there are also T-shaped baffles 64 extending up from the bottom edge. Each baffle 62, 64 is thinner than the adjacent portions of the frame 12. This arrangement of baffles 62, 64 helps to provide a substantially uniform electrolyte flow throughout the chamber K, and helps hold the electrodes 18 and 19 at a uniform spacing.

Above the electrolyte chamber K, the slot or channel 15 extends the entire width of the chamber K, apart from a narrow frame portion 66 at the centre, and extends beyond the sides of the chamber K to communicate with the tops of the side chambers 36. At each end of the channel 15 the frame 12 defines a curved lip 68 that projects to about the middle of the side chamber 36, being slightly smaller than the projection 46 on the adjacent electrodes 18, 19. To each side of the narrow frame portion 66 the portions of the frame 12 above and below the slot or channel 15 are connected by three strips 67 which are thinner than the portion of the frame 12 below the slot or channel 15. The groove 38a with the corresponding gasket extends in this case not only outside the side chamber 36 but also across the width of the frame 12 above the slot or channel 15.

In use of the cell stack 10 electrolyte flows into the electrolyte chamber K from all the openings 56, and emerges through all of the grooves 60 into the slot or channel 15. The electrolyte does not completely fill this channel 15, so there is a gas space above the electrolyte, and a free surface of the electrolyte; the electrolyte flows along the channel 15 to flow over the projecting lip 68 into the side chamber 36. The electrolyte falls freely to the bottom of the side chamber 36, breaking up into droplets, and then flows the length of the stack 10 along the channel defined by the side chambers 36 to emerge through the outlet duct 116. The outlet duct 116 returns the electrolyte to a storage tank (not shown). The dimensions of the outlet duct 116 and the flow rate of electrolyte through the stack 10 are such that the outlet duct 116 is never completely full of electrolyte, so there is always free access for gas from above the electrolyte in the storage tank to the side chambers 36, and so into the slot or channel 15.

Any electrical connections between successive electrodes, as shown in FIG. 2, are outside the cell stack 10, and therefore are not exposed to the electrolyte.

The above description has primarily emphasised the features of the frames 12 which define the electrolyte chambers K, but has pointed out that the other frames 13, 14 have many features in common. They differ in not defining a slot or chamber 15 above the chamber O or H. They also differ in the detailed layout of the grooves 38 and the sealing gasket 37, for example in providing a seal 70 all around the aperture 45, and in that the groove 38a continues across the top of the side chamber 36 to meet the groove 38, so the side chamber 36 is completely surrounded by a gasket 37.

Figure 4:
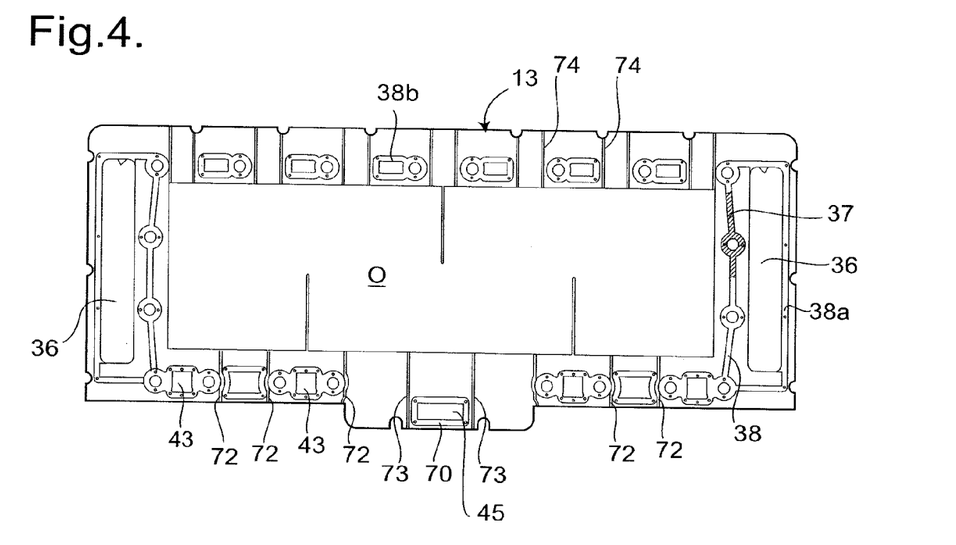
FIG. 4 shows a side view of an air plate of the fuel cell stack of FIG. 1 (to a smaller scale than FIG. 3)

Referring now to FIG. 4, as regards the frame 13 which defines the oxidising gas chamber O, this differs from the frame 12 in that there are gaps in the groove 38 and the sealing gasket 37 between the seal around the aperture 44 and the seal around the adjacent apertures 34. Within each such gap there is a narrow groove 72 extending between the gas chamber O and the outside of the frame 13, for outflow of air. There is also a groove 72 next to each side of the tab 32, and a similar groove 73 on each side of the seal 70 around the aperture 45. Similar narrow grooves 74 extend in the gaps between the successive grooves 38b, so air can flow into the oxidising gas chamber O from the enclosed chamber 27 (see FIG. 2) above the stack 10.

Figure 5:
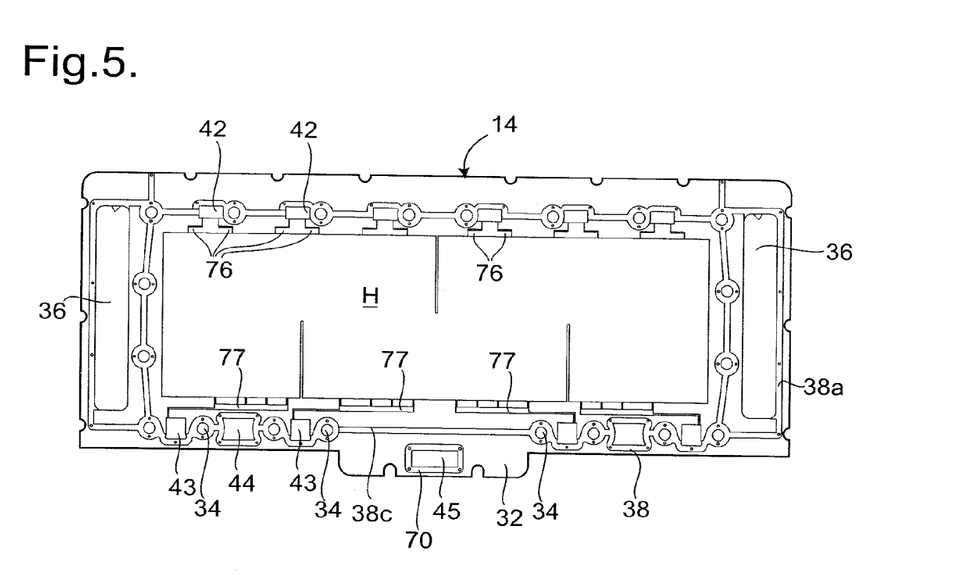
FIG. 5 shows a side view of a fuel plate of the fuel cell stack of FIG. 1 (to a smaller scale than FIG. 3)

Referring now to FIG. 5, as regards the frame 14 which defines the fuel gas chamber H, this differs from the frame 12 in that the groove 38 and the sealing gasket 37 extends continuously around the entire periphery of the chamber H, surrounding each circular aperture 34, including a length of gasket 37 in a groove 38c between the apertures 34 on either side of the tab 32, but with no seal between each aperture 42 and 43 and the chamber H. Narrow branched grooves 76 and 77 respectively, link the apertures 42 and 43 with the chamber H. Hydrogen gas, as the fuel, is supplied through the apertures 42, and withdrawn through the apertures 43; the hydrogen flows through the duct defined by the apertures 43 to the end plate 16 (shown in FIG. 1), which defines channels that link the apertures 43 and 44, so the outflowing hydrogen flows back through the duct defined by the apertures 44 to the outflow duct 112.

It will be appreciated that the cell stack described above is by way of example only, and may be modified in various ways. The frames 12, 13, and 14 and also the chambers K, O and H may have a different shape to that shown here; and the outlet from the electrolyte chamber K may be through one or more wide grooves or slots in place of the several narrow grooves 60. In one modification the electrolyte chamber K may be filled with a porous material or a mesh which acts as a wick.

Figure 6:
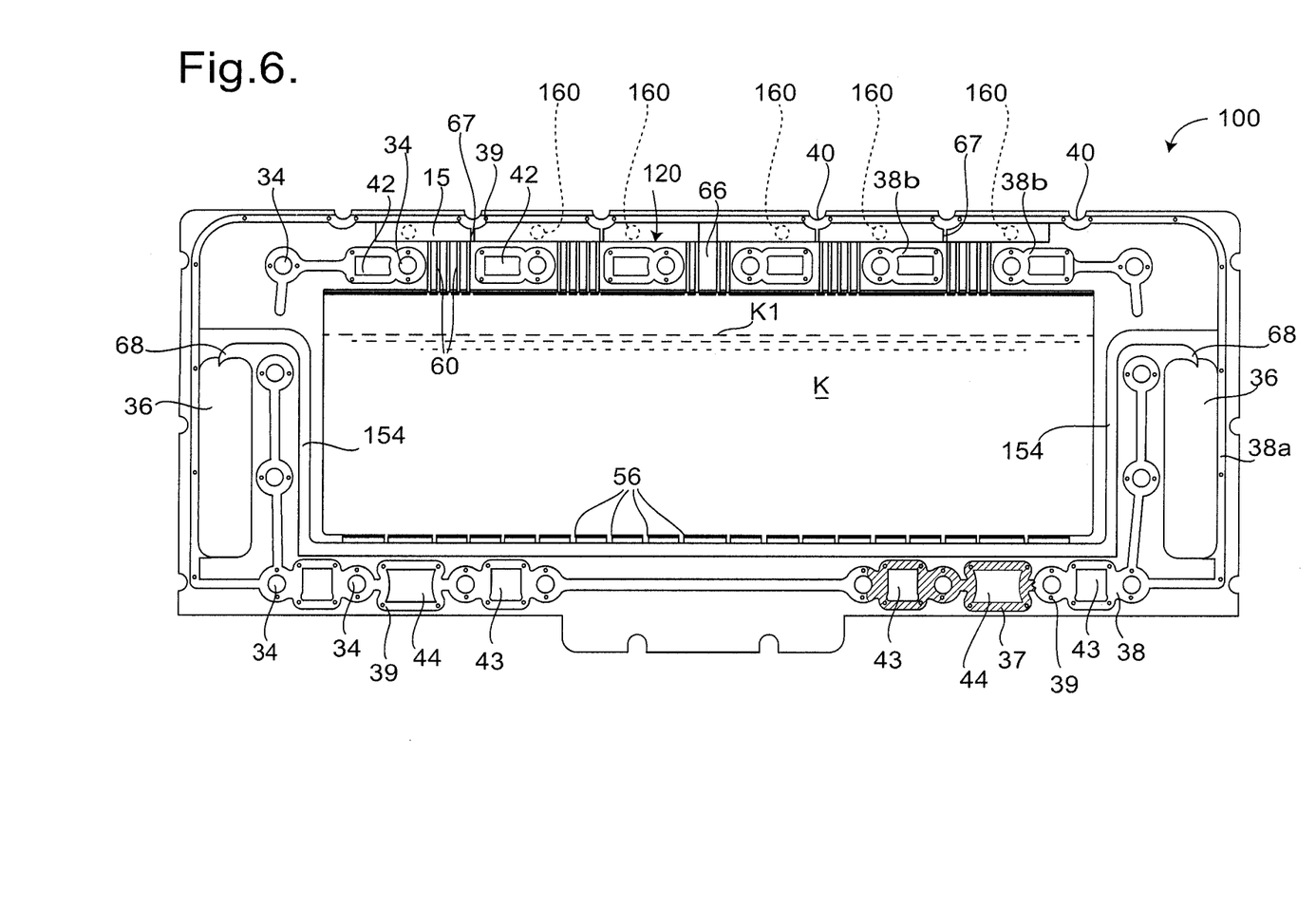
FIG. 6 shows a side view of an electrolyte plate of a modification to the fuel cell stack of FIG. 1.

Referring now to FIG. 6 there is shown a side view of a frame 120 of a cell stack 100 which is a modification to the cell stack 10; many features are substantially equivalent to those of the cell stack 10, and are referred to by the same reference numerals. The frame 120 defines a rectangular electrolyte chamber K. The frame 120 differs from the frame 12 principally in that the lip 68 over which outflowing electrolyte falls into the side chamber 36 is at a height which is below the top of the electrolyte chamber K. The openings 56 along the bottom of the electrolyte chamber K communicate via a groove 154 which extends alongside the sides of the electrolyte chamber K to just above the lip 68. The electrolyte flows downwardly through the electrolyte chamber K, out through the openings 56, along the groove 154, and falls in droplets over the lip 68 into the side chamber 36.

As indicated by the broken line K1, the surface of the electrolyte in each electrolyte chamber K, in use, is therefore just above the level of the lip 68, and is below the top of the electrolyte chamber K. The electrolyte to each cell is supplied through aligned apertures 160 in the frames equivalent to the frames 13 and 14 (the locations of six such apertures 160 being shown in broken lines) which communicate with the slot or chamber 15, so the electrolyte flows into the electrolyte chamber K through the parallel grooves 60, falling as droplets through the space between the top of the electrolyte chamber K and the electrolyte surface K1.

The frames (not shown) equivalent to the frames 13 and 14 of the cell stack 100 differ from the frames 13 and 14 in that the side chambers 36 do not extend so high; and they differ also in not defining the apertures 45, but instead defining the apertures 160 for the supply of electrolyte. The operation of the cell stack 100 is substantially identical to that of the cell stack 10, except that the electrolyte flows downwardly through the electrolyte chamber K instead of upwardly, and that the electrolyte therefore breaks up into droplets not only at the outlet, where it falls into the side chamber 36, but also at the inlet, where it falls between the parallel grooves 60 and the electrolyte surface K1.

The cell stacks 10 and 100 may in practice have over a hundred cells, so that the stack 10 or 100 provides an EMF of over 100 V. In the cell stack 10, the provision of the single long narrow groove 52 to supply electrolyte to the cell, and the freely falling electrolyte dripping from the curved lip 68 in the side channel 36, both suppress any leakage current. In one example a fuel cell stack 10 with one hundred cells provided an electrical output 50 A at about 100 V, and a leakage current of less than 1 A. In the cell stack 100, the leakage current is considerably less.

In a modification the cell stacks 10 and 100 may also include an air bleed into the side chambers 36. In the cell stack 10 such an air bleed may be provided by defining two narrow grooves in the top of the frame 12 closest to the end plate 16, each groove communicating between the enclosed chamber 27 above the fuel cell stack 10 and the slot or chamber 15 in that frame 12, one groove on each side of the narrow frame portion 66. This ensures that air will flow through all the side chambers 36, and flow out of the outlet duct 116 at the opposite end of the fuel cell stack 10, carrying any hydrogen gas with it.

What is claimed:

1. An alkaline fuel cell stack comprising: a plurality of fuel cells each with a chamber for electrolyte with at least one inlet and at least one outlet, and an inlet header to supply electrolyte to all the cells in parallel, wherein each cell comprises a first plate to define an electrolyte chamber that is structured to support the flow of electrolyte in the chamber, a second plate to define an oxidising gas chamber that is structured to support an oxidising gas and a third plate to define a fuel gas chamber that is structured to support a fuel gas, all the plates of the stack being of insulating plastics material and extending in vertical planes, so each plate has an upper edge and a lower edge and the stack defines an upper face and a lower face;

wherein each first plate, each second plate, and each third plate also defines at least one side chamber adjacent to but sealed from the electrolyte chamber, the oxidising gas chamber and the fuel gas chamber respectively, the fuel cell stack also comprising electrodes that extend beyond the periphery of the adjacent electrolyte chambers, wherein the electrodes also define side chambers corresponding to the side chambers of the adjacent plates, the corresponding side chambers of the plates and electrodes of the stack communicating with each other to define an electrolyte outlet channel; the electrolyte being arranged to flow vertically upwards or downwards through the electrolyte chamber;

an electrolyte flow channel arranged to carry outflowing electrolyte from the electrolyte chamber;

the electrolyte flow channel communicating with the electrolyte outlet channel through a single port near the top of the electrolyte outlet channel, the port including a lip projecting into the electrolyte outlet channel, corresponding projecting portions of adjacent electrodes being larger than the projecting lip and so projecting farther, so that the electrolyte from the electrolyte flow channel flows over the projecting lip and falls freely into the electrolyte outlet channel, the projecting lip configured to cause the electrolyte flow to break-up into droplets, the droplets causing a physical disconnect in the flow of the electrolyte to thereby suppress leakage current.

2. An alkaline fuel cell stack as claimed in claim 1 wherein the electrolyte flow channel is defined above and in communication with the electrolyte chamber, arranged such that in use there is a free surface of electrolyte within the electrolyte flow channel, the electrolyte flow channel being separate from the corresponding electrolyte flow channels for other cells in the stack, but communicating with the side chamber such that the free surfaces of all the electrolyte flow channels are at a common pressure, the electrolyte flowing vertically upwards through the electrolyte chamber, and the electrolyte then falling from the electrolyte flow channel into the electrolyte outlet channel.

3. An alkaline fuel cell stack as claimed in claim 1 wherein the electrolyte is arranged to flow vertically downwards through the electrolyte chamber, the electrolyte flow channel communicating between the bottom of the electrolyte chamber and near the top of the electrolyte outlet channel.

4. An alkaline fuel cell stack as claimed in claim 3 wherein the electrolyte flow channel communicates with the electrolyte outlet channel at a height below the top of the electrolyte chamber, so in operation there is a space between a liquid surface in the electrolyte chamber and to the top the electrolyte chamber.

5. An alkaline fuel cell stack as claimed in claim 1 wherein the electrolyte chamber communicates via a plurality of outlet channels with the electrolyte flow channel.

6. An alkaline fuel cell stack as claimed in claim 2 wherein the electrolyte is fed from the header into the electrolyte chamber through a flow channel with a cross-sectional area less than 12 mm$^2$, and of length greater than 50 mm.

7. An alkaline fuel cell stack as claimed in claim 6 wherein a single header communicates with multiple inlets into the electrolyte chamber, through a flow channel with a plurality of successive branches that communicate with the inlets.

8. An alkaline fuel cell stack as claimed in claim 7 wherein the path length between the header and each inlet is at least 200 mm.

9. An alkaline fuel cell stack comprising a plurality of fuel cells each with a chamber for electrolyte with at least one inlet and at least one outlet, and an inlet header to supply electrolyte to all the cells in parallel, wherein each cell comprises a first plate to define an electrolyte chamber that is structured to support the flow of electrolyte in the chamber, a second plate to define an oxidising gas chamber that is structured to support an oxidising gas and a third plate to define a fuel gas chamber that is structured to support a fuel gas, all the plates of the stack extending in vertical planes, so each plate has an upper edge and a lower edge and the stack defines an upper face and a lower face; wherein each first plate, each second plate, and each third plate also defines at least one side chamber adjacent to but sealed from the electrolyte chamber, the oxidising gas chamber and the fuel gas chamber respectively, the fuel cell stack also comprising electrodes that extend beyond the periphery of the adjacent electrolyte chambers, wherein the electrodes also define side chambers corresponding to the side chambers of the adjacent plates, the corresponding side chambers of the plates and the electrodes of the stack communicating with each other to define an electrolyte outlet channel; the electrolyte being arranged to flow vertically upwards or downwards through the electrolyte chamber; an electrolyte flow channel arranged to carry outflowing electrolyte from the electrolyte chamber, the electrolyte flow channel communicating with the electrolyte outlet channel through a single port near the top of the electrolyte outlet channel, the port including a lip projecting into the electrolyte outlet channel so that the electrolyte from the electrolyte flow channel flows over the projecting lip and falls freely into the electrolyte outlet channel, the projecting lip configured to cause the electrolyte flow to break-up into droplets, the droplets causing a physical disconnect in the flow of the electrolyte to thereby suppress leakage current;

wherein the electrolyte flow channel is defined above and in communication with the electrolyte chamber, arranged such that in use there is a free surface of electrolyte within the electrolyte flow channel, the electrolyte flow channel being separate from the corresponding electrolyte flow channels for other cells in the stack, but communicating with the side chamber such that the free surfaces of all the electrolyte flow channels are at a common pressure, the electrolyte flowing vertically upwards through the electrolyte chamber, and the electrolyte then falling from the electrolyte flow channel into the electrolyte outlet channel; and wherein the fuel cell stack also comprises an air supply plenum defined in part by a downwardly-projecting flange, and a resilient seal along the lower edge of the flange to seal the flange to the upper face of the fuel cell stack, and each second plate defining channels communicating between the upper edge of the second plate and the oxidising gas chamber, and channels communicating between the oxidising gas chamber and another edge of the second plate, so the stack defines air flow paths between the air supply plenum at the upper face of the stack and another face of the stack through the plurality of oxidising gas chambers.

10. An alkaline fuel cell stack as claimed in claim 9 wherein the fuel cell stack locates within a container comprising a cover, and the cover defines the downwardly-projecting flange that defines the air supply plenum.

11. An alkaline fuel cell stack as claimed in claim 1 further comprising a container within which the fuel cell stack locates, the container comprising a cover, the cover comprising a downwardly-projecting flange and means to seal the flange to the upper face of the fuel cell stack so as to define an air supply plenum, and each second plate defining channels communicating between the upper edge of the second plate and the oxidising gas chamber, and channels communicating between the oxidising gas chamber and another edge of the second plate, so the stack defines air flow paths between the upper face of the stack and another face of the stack through the plurality of oxidising gas chambers.

\* \* \* \* \*